United States Patent
Li

(10) Patent No.: US 11,202,353 B2
(45) Date of Patent: Dec. 14, 2021

(54) INTELLIGENT LIGHTING CONTROL METHOD BASED ON THE NUMBER OF PERSONS

(71) Applicant: ANHUI DJX INFORMATION TECHNOLOGY CO., LTD., Anhui (CN)

(72) Inventor: Longyun Li, Anhui (CN)

(73) Assignee: ANHUI DJX INFORMATION TECHNOLOGY CO., LTD., Anhui (CN)

( * ) Notice: Subject to any disclaimer, the term of this patent is extended or adjusted under 35 U.S.C. 154(b) by 445 days.

(21) Appl. No.: 16/307,467

(22) PCT Filed: Oct. 31, 2018

(86) PCT No.: PCT/CN2018/112988
§ 371 (c)(1),
(2) Date: Dec. 5, 2018

(87) PCT Pub. No.: WO2020/062403
PCT Pub. Date: Apr. 2, 2020

(65) Prior Publication Data
US 2021/0204380 A1    Jul. 1, 2021

(30) Foreign Application Priority Data

Sep. 28, 2018 (CN) .......................... 201811140922.7

(51) Int. Cl.
*H05B 47/10* (2020.01)
*H05B 47/115* (2020.01)
*G06K 9/00* (2006.01)

(52) U.S. Cl.
CPC ....... *H05B 47/115* (2020.01); *G06K 9/00664* (2013.01)

(58) Field of Classification Search
CPC .. H05B 47/105; H05B 47/115; H05B 47/125; H05B 47/13; H05B 47/19
See application file for complete search history.

(56) References Cited

U.S. PATENT DOCUMENTS 10,736,202 B2 * 8/2020 Magielse ............. H05B 47/175
11,026,318 B2 * 6/2021 Pandharipande .... H05B 47/115
(Continued)

*Primary Examiner* — Tung X Le
(74) *Attorney, Agent, or Firm* — JCIPRNET

(57) ABSTRACT

The present application provides an intelligent lighting control method based on the number of persons, which includes: counting the number of persons within the target area; dividing the target area into m detection sub-areas, and counting the number of the detection sub-areas where a person is present; selecting the lighting color of the indoor light fixture based on the number of persons within the target area; selecting the lighting mode of the indoor light fixture based on the number of the detection sub-areas where a person is present. The present application adjusts the lighting color, light display mode and illumination brightness of indoor light fixture by analyzing the number of persons within the target area and the degree of dispersion of indoor persons, thereby avoiding the trouble of switching light switch for users and improving the intelligence of the home lighting system, and greatly enhance the user experience, to provide users with a better quality, comfortable living environment.

3 Claims, 1 Drawing Sheet

(56) References Cited

U.S. PATENT DOCUMENTS

| | | | |
|---|---|---|---|
| 2017/0038787 A1* | 2/2017 | Baker | H04W 4/021 |
| 2017/0048950 A1* | 2/2017 | Deese | H05B 47/175 |
| 2018/0167547 A1* | 6/2018 | Casey | H05B 47/115 |
| 2021/0298157 A1* | 9/2021 | Olaleye | H05B 47/155 |

* cited by examiner

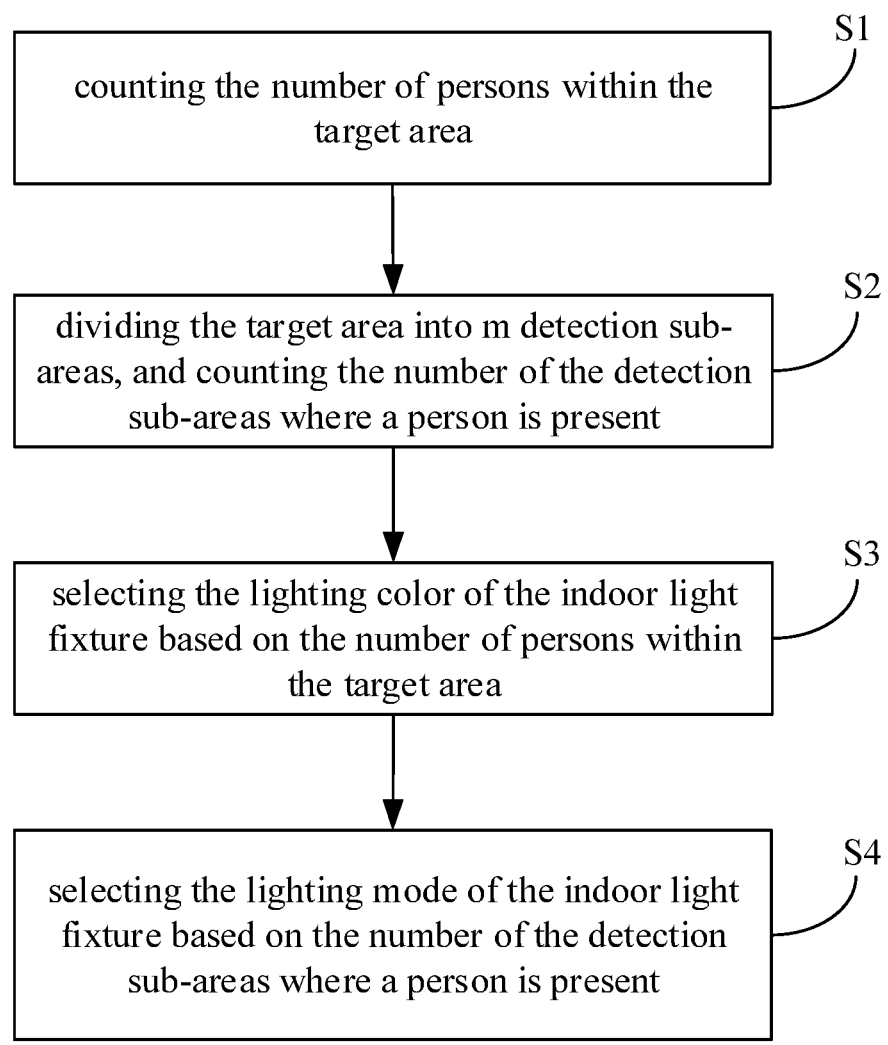

INTELLIGENT LIGHTING CONTROL METHOD BASED ON THE NUMBER OF PERSONS

CROSS-REFERENCE TO RELATED APPLICATION

This application is a 371 application of the international PCT application serial no. PCT/CN2018/112988, filed on Oct. 31, 2018, which claims the priority benefit of China application no. 201811140922.7, filed on Sep. 28, 2018, entitled "intelligent lighting control method based on the number of persons". The entirety of each of the above-mentioned patent applications is hereby incorporated by reference herein and made a part of this specification.

The present application claims priority to Chinese patent application NO. 201811140922.7, filed to the Chinese Patent Office on Sep. 28, 2018, entitled "INTELLIGENT LIGHTING CONTROL METHOD BASED ON THE NUMBER OF PERSONS", the entire disclosure of which is incorporated herein by reference.

BACKGROUND

Technical Field

The present application relates to the field of lighting control method, and particularly to intelligent lighting control method based on the number of persons.

Background Art

At present, with the development of the economy, indoor lighting, landscape lighting and architectural lighting have received more and more attention and attention. Lighting only focuses on brightness from the very beginning, to pursuit of brightness while pursuing beauty in modern, which not only promotes the intelligent development of lighting fixture, but also enhances people's quality of life. However, the functions of existing home lighting systems are still relatively simple, which need to be based on the user's operation and combination with the switch operation, the adjustment of the lighting color and illumination brightness of the light fixture can be realized. This method relies entirely on labor, which not only increases the trouble of the user's operation, but also reduces the intelligence of the home lighting system. Therefore, there is a need for a more intelligent home lighting system that greatly enhances the user's experience on the basis of ensuring the intelligent control of the lighting system, to fully meet the user's needs.

SUMMARY OF THE INVENTION

Based on the technical problems existing in the background art, the present application provides an intelligent lighting control method based on the number of persons.

The present application provides an intelligent lighting control method based on the number of persons, which includes:

S1: counting the number of persons within the target area;

S2: dividing the target area into m detection sub-areas, and counting the number of the detection sub-areas where a person is present;

S3: selecting the lighting color of the indoor light fixture based on the number of persons within the target area;

S4: selecting the lighting mode of the indoor light fixture based on the number of the detection sub-areas where a person is present;

wherein, m is a preset value, and m≥2.

Preferably, in S2, when a person is on the boundary between the i-th detection sub-area and the j-th detection sub-region, it is determined that the i-th detection sub-area and the j-th detection sub-area both have the presence of the person; wherein, 1≤i≤m, 1≤j≤m.

Preferably, in step S3, x preset person values increasing in turn are stored, which are recorded as N1, N2, N3, . . . , Nx, and x colors with one by one correspondence to x preset person values are also stored;

step S3 specifically includes:

obtaining the number of persons within the target area, which is recorded as N;

comparing the number N of persons within the target area respectively with the x preset person values $N_1$, $N_2$, $N_3$, . . . , $N_x$:

when N≥Np, selecting the p-th color corresponding to the p-th preset person values as the lighting color of the indoor light fixture;

wherein, 1≤p≤x.

Preferably, in step S4, the first preset quantity value $W_1$ and the second preset quantity value $W_2$ are stored;

step S4 specifically includes:

obtaining the number of the detection sub-areas with the presence of a person, which is recorded as W;

comparing the number W of the detection sub-areas where a person is present with the first preset quantity value $W_1$ and the second preset quantity value $W_2$ respectively:

when W≤$W_1$, selecting a first lighting mode for indoor light fixture;

when $W_1$<W<$W_2$, selecting a second lighting mode for indoor light fixture;

when W≥$W_2$, selecting a third lighting mode for indoor light fixture;

wherein, the first lighting mode is that the indoor light fixture is illuminated in ambient light mode, and the illumination brightness of the indoor light fixture is $L_1$;

the second lighting mode is that the indoor light fixture is illuminated in ambient light mode, and the illumination brightness of the indoor light fixture is $L_2$;

the third lighting mode is that the indoor light fixture is illuminated by contour light mode, and the illumination brightness of the indoor light fixture is $L_3$;

wherein, $L_1$, $L_2$, $L_3$ are preset values, and $L_1$<$L_2$<$L_3$.

Preferably, in S1, a plurality of acquisition units is used to count the number of persons within the target area, and the plurality of acquisition units are installed at different locations.

Preferably, in S2, a plurality of detection units is used to detect whether there is a person in any one of the detecting sub-areas, and the plurality of detection units are installed at different locations.

Preferably, the indoor light fixture includes a plurality of light fixture units, and the plurality of light fixture units are installed at different locations.

The present application provides an intelligent lighting control method based on the number of persons, which adjusts the lighting status of indoor light fixture from two aspects; the first aspect is: selecting lighting colors for indoor light fixture by counting the number of persons within the target area, which achieve to select a warm lighting color to enhance the indoor lighting atmosphere when there are a small number of persons, or to select a cool lighting color to prevent to create a congested, dim indoor lighting environment due to the warm lighting when there are a larger number of persons, to fully meet the needs of users in the process of use; the second aspect is: determining the degree of dispersion of the indoor persons by dividing the target area and counting the number of the detection sub-areas where a person is present, then adjusting the light display mode and the illumination brightness of the indoor light fixture according to the degree of dispersion of the person, which makes the final selected lighting mode meet the lighting requirements of people in different indoor areas, and enhances the lighting indoor environment by the switching of the light display mode, thereby improving the user's comfort.

The present application adjusts the lighting color, light display mode and illumination brightness of indoor light fixture by analyzing the number of persons within the target area and the degree of dispersion of indoor persons, thereby avoiding the trouble of switching light switch by users and improving the intelligence of the home lighting system, and greatly enhance the user experience, to provide users with a better quality, comfortable living environment.

BRIEF DESCRIPTION OF DRAWING

FIG. 1 is a schematic flow chart of an intelligent lighting control method based on the number of persons.

DETAILED DESCRIPTION OF THE INVENTION

As shown in FIG. 1, FIG. 1 is a schematic flow chart of an intelligent lighting control method based on the number of persons according to the present application.

Referring to FIG. 1, the present application provides an intelligent lighting control method based on the number of persons, which includes the following steps:

S1. counting the number of persons within the target area.

In an embodiment of the present application, a plurality of acquisition units are used to count the number of persons within the target area, and the plurality of acquisition units are installed at different locations, thereby collecting the number of persons within the target area from different angles and different positions, which is beneficial to improve the accuracy of the collection results.

S2. dividing the target area into m detection sub-areas, and counting the number of the detection sub-areas where a person is present.

In an embodiment of the present application, when a person is on the boundary between the i-th detection sub-area and the j-th detection sub-region, it is determined that the i-th detection sub-area and the j-th detection sub-area both have the presence of the person; wherein, $1 \leq i \leq m$, $1 \leq j \leq m$.

In an embodiment of the present application, a plurality of detection units are used to detect whether there is a person in any one of the detecting sub-areas and the plurality of detection units are installed at different locations, to detect from different angles and different positions, thereby improving the accuracy of the collection results.

S3. selecting the lighting color of the indoor light fixture based on the number of persons within the target area.

In an embodiment of the present application, in S3, x preset person values increasing in turn are stored, which are recorded as $N_1, N_2, N_3, \ldots, N_x$, and x colors with one by one correspondence to x preset person values are also stored.

The step S3 specifically includes:

obtaining the number of persons within the target area, which is recorded as N;

comparing the number N of persons within the target area respectively with the x preset person values N1, N2, N3, . . . , Nx:

when $N \geq Np$, indicating the number N of persons within the target area has reached p-th level, to ensure suitability of light color of the light fixture, selecting the p-th color corresponding to the p-th preset person values as the lighting color of the indoor light fixture;

wherein $1 \leq p \leq x$.

S4. selecting the lighting mode of the indoor light fixture based on the number of the detection sub-areas where a person is present;

wherein, m is a preset value, and $m \geq 2$.

In an embodiment of the present application, in step S4, the first preset quantity value $W_1$ and the second preset quantity value $W_2$ are stored.

The step S4 specifically includes:

obtaining the number of the detection sub-areas with the presence of a person, which is recorded as W;

comparing the number W of the detection sub-areas where a person is present with the first preset quantity value $W_1$ and the second preset quantity value $W_2$ respectively;

when $W \leq W_1$, it indicates that the number of the detection sub-areas with the presence of the person is small, that is, the indoor persons are more concentrated, and a first lighting mode is selected for the indoor light fixture at this time; the first lighting mode is that the indoor light fixture is illuminated in ambient light mode, and the illumination brightness of the indoor light fixture is $L_1$; the ambient light can increase the light-receiving area in each detection sub-area, to improve the lighting effect of the indoor light fixture.

when $W_1 < W < W_2$, it indicates that the number of the detection sub-areas with the presence of the person has increased, and a second lighting mode is selected for the indoor light fixture at this time; the second lighting mode is that the indoor light fixture is illuminated in ambient light mode, and the illumination brightness of the indoor light fixture is $L_2$; the ambient light can increase the light-receiving area in each detection sub-area, thereby improving the lighting effect of the indoor light fixture, to improve the illumination brightness of the light fixture to provide stable and sufficient light for persons in different positions.

when $W \geq W_2$, it indicates that the number of the detection sub-areas with the presence of the person is larger, that is, the indoor persons are more dispersed, and a third lighting mode is selected for the indoor light fixture at this time, the third lighting mode is that the indoor light fixture is illuminated by contour light mode, and the illumination brightness of the indoor light fixture is $L_3$; the contour light can ensure that every position indoor can receive light and persons in different positions can be active under bright light to ensure the lighting effect of the lights;

wherein, $L_1, L_2, L_3$ are preset values, and $L_1 < L_2 < L_3$.

In a further embodiment, the indoor light fixture includes a plurality of light fixture units, and the plurality of light fixture units are installed at different locations, to provide an overall stable light source for indoor environment.

The present application provides an intelligent lighting control method based on the number of persons, which adjusts the lighting status of indoor light fixture from two aspects; the first aspect is: selecting lighting colors for indoor light fixture by counting the number of persons within the target area, which achieve to select a warm lighting color to enhance the indoor lighting atmosphere when there are a small number of persons, and to select a cool lighting color to prevent to create a congested, dim indoor lighting environment due to the warm lighting when there are a larger number of persons, fully to meet the needs of users in the process of use; the second aspect is: determining the degree of dispersion of the indoor persons by dividing the target area and counting the number of the detection sub-areas where a person is present, then adjusting the light display mode and the illumination brightness of the indoor light fixture according to the degree of dispersion of the person, which makes the final selected lighting mode meet the lighting requirements of people in different indoor areas, and enhances the lighting indoor environment by the switching of the light display mode, thereby improving the user's comfort.

The present application adjusts the lighting color, light display mode and illumination brightness of indoor light fixture by analyzing the number of persons within the target area and the degree of dispersion of indoor persons, thereby avoiding the trouble of switching light switch by users and improving the intelligence of the home lighting system, and greatly enhance the user experience, to provide users with a better quality, comfortable living environment.

Above description is to illustrate the preferred embodiments not limit the present invention. Various alterations and changes to the present invention are apparent to those skilled in the art. The scope defined in claims shall comprise any modification, equivalent substitution and improvement in the spirit and principle of the present invention.

What is claimed is:

1. An intelligent lighting control method based on a number of persons, comprising following steps:
    S1: counting the number of persons within a target area;
    S2: dividing the target area into m detection sub-areas, and counting a number of the detection sub-areas where a person is present;
    S3: selecting a lighting color of an indoor light fixture based on the number of persons within the target area;
    S4: selecting a lighting mode of the indoor light fixture based on the number of the detection sub-areas where the person is present;
    wherein, m is a preset value, and m≥2;
    wherein, in the step S2, when the person is on the boundary between an i-th detection sub-area and a j-th detection sub-region, it is determined that the i-th detection sub-area and the j-th detection sub-area both have the presence of the person; wherein, 1≤i≤m, 1≤j≤m.

2. The intelligent lighting control method based on the number of persons according to claim 1, wherein in the step S3, x preset person values increasing in turn are stored, which are recorded as $N_1$ to $N_x$, and x colors with one by one correspondence to the x preset person values are also stored;
    the step S3 specifically includes:
    obtaining the number of persons within the target area, recorded as N;
    comparing the number N of persons within the target area respectively with the x preset person values N1, to Nx;
    when N≥Np, selecting a p-th color corresponding to a p-th preset person values as the lighting color of the indoor light fixture; wherein, 1≤p≤x;
    N, x and p are positive numbers.

3. The intelligent lighting control method based on the number of persons according to claim 1, wherein in the step S4, a first preset quantity value $W_1$ and a second preset quantity value $W_2$ are stored;
    the step S4 specifically includes:
    obtaining the number of the detection sub-areas with the presence of the person, recorded as W;
    comparing the number W of the detection sub-areas where the person is present with the first preset quantity value $W_1$ and the second preset quantity value $W_2$ respectively;
    when $W \leq W_1$, selecting a first lighting mode for the indoor light fixture;
    when $W_1 < W < W_2$, selecting a second lighting mode for the indoor light fixture;
    when $W \geq W_2$, selecting a third lighting mode for the indoor light fixture;
    wherein, the first lighting mode is that the indoor light fixture is illuminated in an ambient light mode, and an illumination brightness of the indoor light fixture is $L_1$;
    the second lighting mode is that the indoor light fixture is illuminated in an ambient light mode, and the illumination brightness of the indoor light fixture is $L_2$;
    the third lighting mode is that the indoor light fixture is illuminated by a contour light mode, and the illumination brightness of the indoor light fixture is $L_3$;
    wherein, $L_1$, $L_2$, $L_3$ are preset values, and $L_1 < L_2 < L_3$;
    W and L are positive numbers.

* * * * *